United States Patent
Kotary et al.

(10) Patent No.: US 10,437,310 B2
(45) Date of Patent: Oct. 8, 2019

(54) TECHNOLOGIES FOR SECURE HYBRID STANDBY POWER MANAGEMENT

(71) Applicant: Intel Corporation, Santa Clara, CA (US)

(72) Inventors: Karunakara Kotary, Portland, OR (US); Ashish Hira, Portland, OR (US); Krishnakumar Narasimhan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 117 days.

(21) Appl. No.: 15/387,214

(22) Filed: Dec. 21, 2016

(65) Prior Publication Data
US 2018/0173294 A1    Jun. 21, 2018

(51) Int. Cl.
| G06F 1/32   | (2019.01) |
| G06F 1/3234 | (2019.01) |
| G06F 9/4401 | (2018.01) |
| G06F 1/3228 | (2019.01) |

(52) U.S. Cl.
CPC .......... *G06F 1/3234* (2013.01); *G06F 1/3228* (2013.01); *G06F 9/4416* (2013.01); *G06F 9/4418* (2013.01)

(58) Field of Classification Search
None
See application file for complete search history.

(56) References Cited

U.S. PATENT DOCUMENTS

| 7,039,819 | B1* | 5/2006 | Kommrusch | G06F 1/3203 |
| | | | | 713/322 |
| 9,898,071 | B2* | 2/2018 | Williamson | G06F 1/3293 |
| 2005/0192788 | A1* | 9/2005 | Hobson | G06F 1/3203 |
| | | | | 703/22 |
| 2009/0037932 | A1* | 2/2009 | Clark | G06F 13/24 |
| | | | | 719/315 |
| 2012/0017285 | A1* | 1/2012 | Piwonka | G06F 21/53 |
| | | | | 726/27 |
| 2012/0023364 | A1* | 1/2012 | Swanson | G06F 11/004 |
| | | | | 714/6.12 |
| 2014/0068302 | A1* | 3/2014 | Falik | G06F 1/3206 |
| | | | | 713/323 |
| 2015/0058650 | A1* | 2/2015 | Varma | G06F 1/3293 |
| | | | | 713/324 |

(Continued)

*Primary Examiner* — Danny Chan
(74) *Attorney, Agent, or Firm* — Barnes & Thornburg LLP (57) ABSTRACT

Technologies for secure hybrid standby power management include a computing device with a processor supporting low-power idle standby. An operating system writes a power management sleep request, such as an ACPI S3 request, to a power management control register of the computing device. The processor traps the write to the power management control register and executes a firmware sleep mapper that causes the processor to enter an idle standby power state such as S0ix. The firmware sleep mapper may be included in a firmware isolated memory region. The address of the firmware sleep mapper may be included in a model-specific register of the processor. The processor may verify the firmware sleep mapper before execution. In response to a wake event, the processor resumes the firmware sleep mapper, which switches the processor to real mode and jumps to a waking vector of the operating system. Other embodiments are described and claimed.

25 Claims, 3 Drawing Sheets

(56) References Cited

U.S. PATENT DOCUMENTS

| | | | |
|---|---|---|---|
| 2015/0067214 A1* | 3/2015 | Henry | G06F 1/3237 710/261 |
| 2015/0113257 A1* | 4/2015 | Lewis | G06F 9/4806 713/1 |
| 2016/0216756 A1* | 7/2016 | Yang | G06F 1/3243 |
| 2016/0282927 A1* | 9/2016 | Adams | G06F 13/24 |

* cited by examiner

TECHNOLOGIES FOR SECURE HYBRID STANDBY POWER MANAGEMENT

BACKGROUND

Energy efficiency is an increasingly important consideration for current computing devices. For portable devices such as laptops, tablets, and smartphones, energy efficiency directly affects battery life, which is an important part of the user experience. For server devices, energy efficiency directly affects cost, compute density, and thermal management. Many computing devices and processors support a reduced-power sleep state defined by the Advanced Configuration and Power Interface (ACPI) specification, also known as the "S3" state. In the ACPI S3 sleep state, volatile memory may remain powered on to preserve its contents while other components of the computing device such as the processor are powered off. When resuming from the S3 sleep state, the processor typically powers back on and performs a firmware boot flow to resume operation.

Current processors may also support a balance of different performance and power consumption levels. For example, processors may scale performance and power consumption to improve performance under load and to reduce power consumption when idle or lightly loaded. Current processors and devices may also support low-power usage models, such as an S0ix low-power idle state, which allow the device to achieve extremely low power consumption for certain usage models. Using S0ix and other modern low-power usage states may require operating system or other software support. Additionally, many current processors no longer support the ACPI S3 sleep state.

Computing devices typically include firmware responsible for hardware initialization, low-level hardware management, and managing the boot process. The main platform firmware responsible for booting the computing device may be implemented according to the Unified Extensible Firmware Interface ("UEFI") specification, which has several versions published by the Unified EFI Forum. The UEFI specification specifies an interface between the firmware of the computing device and the operating system of the computing device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
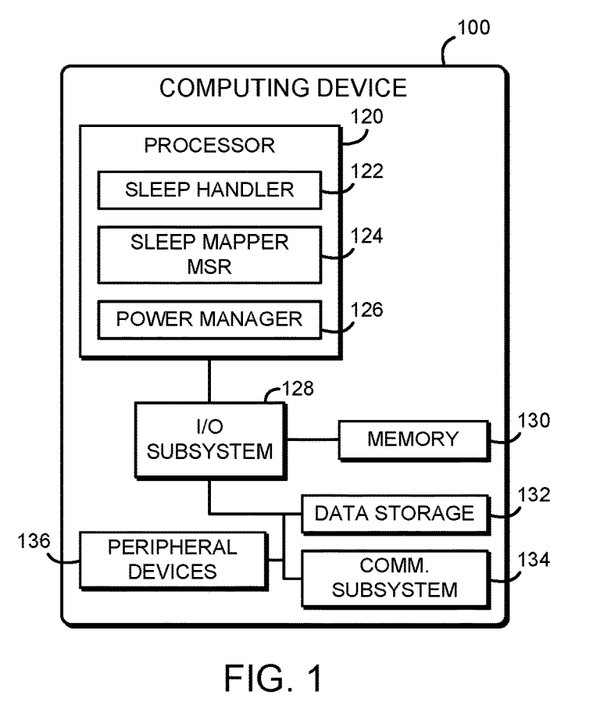
FIG. 1 is a simplified block diagram of at least one embodiment of a computing device for secure hybrid standby power management.

Referring now to FIG. 1, an illustrative computing device 100 for secure hybrid standby power management includes a processor 120, an I/O subsystem 128, a memory 130, a data storage device 132, and communications subsystem 134. In use, as described below, the computing device 100 stores a sleep mapper firmware shim into a protected memory region. At runtime, an operating system writes to a power management control register to request entry into the ACPI S3 sleep state. Rather than entering S3, the processor 120 traps the write to the power management control register and invokes the sleep mapper firmware shim. The sleep mapper firmware shim causes the processor 120 to enter a low-power idle standby power state such as an S0ix state (e.g., S0i3). After a wake event, the sleep mapper firmware shim resumes execution, switches the processor 120 to real mode, and then invokes the operating system waking vector. The operating system resumes operation as if resuming from S3 sleep. Thus, the computing device 100 may remove hardware and firmware support for ACPI S3 sleep while remaining compatible with existing operating systems and other software that invokes the ACPI S3 state and allowing that software to take advantage of the improved power consumption and fast resume times offered by modern power management states such as S0ix. Removing support for ACPI S3 may also simplify hardware design and validation as well as firmware enablement. Additionally, the computing device 100 does not require the processor 120 to be reset, which may improve the time required to enter sleep as well as remove a firmware boot flow for resuming from sleep. Further, the computing device 100 does not rely on system management mode (SMM) to handle the sleep request and thus eliminates any potential exposure to SMM vulnerabilities.

The computing device 100 may be embodied as any type of device capable of secure hybrid standby power management and otherwise performing the functions described herein. For example, the computing device 100 may be embodied as, without limitation, a laptop computer, a notebook computer, a tablet computer, a smartphone, a wearable computing device, a computer, a workstation, a server, a multiprocessor system, and/or a consumer electronic device. As shown in FIG. 1, the illustrative computing device 100 includes the processor 120, the I/O subsystem 128, the memory 130, and the data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 includes a sleep handler 122, a sleep mapper model-specific register (MSR) 124, and a power manager 126. As described further below, the sleep handler 122 traps a write to a power management control register of the computing device 100 and in response executes a firmware sleep mapper shim function. As described further below, the firmware sleep mapper may be stored in an isolated memory region of the memory 130. The sleep handler 122 may be embodied as hardware, firmware, and/or microcode of the processor 120. The sleep mapper MSR 124 stores the base address of the firmware sleep mapper. As described further below, the power manager 126 controls various power management features of the processor 120, including controlling voltage, controlling frequency, entering idle standby mode, responding to wake events, and/or otherwise controlling power consumption of the processor 120.

The memory 130 may be embodied as any type of volatile or non-volatile memory or data storage capable of performing the functions described herein. In operation, the memory 130 may store various data and software used during operation of the computing device 100 such operating systems, applications, programs, libraries, and drivers. As described above, the memory 130 may also include one or more isolated memory regions configured by platform firmware, which may include protected firmware routines such as the firmware sleep mapper. The memory 130 is communicatively coupled to the processor 120 via the I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 128 may form a portion of a system-on-a-chip (SoC) and be incorporated, along with the processor 120, the memory 130, and other components of the computing device 100, on a single integrated circuit chip.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The data storage device 132 may store one or more operating systems and/or firmware environments that may be executed by the computing device 100. For example, the data storage device 132 may store a firmware volume as defined by the UEFI specification.

The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The computing device 100 may further include one or more peripheral devices 136. The peripheral devices 136 may include any number of additional input/output devices, interface devices, and/or other peripheral devices. For example, in some embodiments, the peripheral devices 136 may include a touch screen, graphics circuitry, an audio device, a microphone, a camera, a keyboard, a mouse, and/or other input/output devices, interface devices, and/or peripheral devices.

Figure 2:
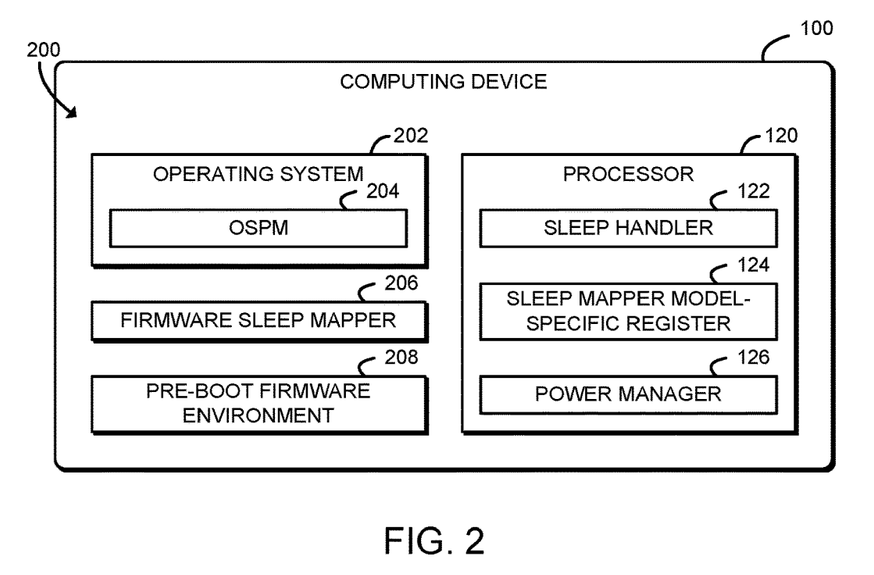
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes an operating system 202 that includes an operating system power manager 204, a firmware sleep mapper 206, and a pre-boot firmware environment 208. As shown, the environment 200 also includes the processor 120, including the sleep handler 122, the sleep mapper MSR 124, and the power manager 126. The various components of the environment 200 may be embodied as hardware, firmware, microcode, software, or a combination thereof. As such, in some embodiments, one or more of the components of the environment 200 may be embodied as circuitry or collection of electrical devices (e.g., operating system power manager circuitry 204, firmware sleep mapper circuitry 206, pre-boot firmware environment circuitry 208, sleep handler circuitry 122, and/or power manager circuitry 126). It should be appreciated that, in such embodiments, one or more of the operating system power manager circuitry 204, the firmware sleep mapper circuitry 206, the pre-boot firmware environment circuitry 208, the sleep handler circuitry 122, and/or the power manager circuitry 126 may form a portion of the processor 120, the I/O subsystem 128, and/or other components of the computing device 100. Additionally, in some embodiments, one or more of the illustrative components may form a portion of another component and/or one or more of the illustrative components may be independent of one another.

The operating system 202 may be embodied as any operating system, hypervisor, virtual machine monitor, or other control structure of the computing device 100. The operating system 202 takes control of the computing device 100 after the pre-boot firmware environment 208 terminates boot services. The operating system 202 includes the operating system power manager (OSPM) 204 that performs power management functions, including managing system states as described by the ACPI specification. The operating system power manager 204 is configured to generate a write to a power management control register of the computing device 100, such as the ACPI PM1 _CNT register. The write may include a power management sleep request, such as an ACPI S3 sleep request. As described further below, the operating system 202 also includes a waking vector, which may be embodied as a memory address, function, subroutine, or other entry point that may be executed when the computing device 100 exits the ACPI S3 sleep state.

The sleep handler 122 is configured to trap writes to the power management control register, and execute the firmware sleep mapper 206 in response to trapping a write. The sleep handler 122 may be further configured to determine whether a write is indicative of a power management sleep request and, if so, execute the firmware sleep mapper 206. The sleep mapper MSR 124 may include the address of the firmware sleep mapper 206. In some embodiments, the sleep handler 122 may be further configured to verify the firmware sleep mapper 206 in response to trapping the write and, if verified, execute the firmware sleep mapper 206. As described above, the sleep handler 122 may be embodied as hardware, firmware, and/or microcode of the processor 120.

The firmware sleep mapper 206 is configured to cause the processor 120 to enter an idle standby power state such as an S0ix idle standby state in response to being executed. The firmware sleep mapper 206 may cause the processor 120 of the computing device 100 to enter the idle standby power state by setting each core of the processor 120 to a deep idle power state, such as the ACPI C7 state. The firmware sleep mapper 206 may be located in a firmware isolated memory region. The firmware sleep mapper 206 may be further configured to switch the processor 120 to real mode in response to resuming execution after exiting the idle standby power state and then jump to the waking vector of the operating system 202. The firmware sleep mapper 206 may be further configured to load the waking vector from a firmware configuration table of the computing device 100. The firmware sleep mapper 206 may be further configured to reset one or more embedded controllers of the computing device 100 (e.g., the I/O subsystem 128) in response to resuming the firmware sleep mapper 206 after exiting the idle standby power state.

The pre-boot firmware environment 208 may be embodied as any pre-boot firmware environment that initializes and configures components of the computing device 100 prior to passing control of the computing device 100 to the operating system 202. For example, the pre-boot firmware environment 208 may be embodied as a UEFI-compliant firmware environment, a Core Boot firmware, and/or a UBOOT firmware. The pre-boot firmware environment 208 is configured to copy a binary image of the firmware sleep mapper 206 to the address of the firmware sleep mapper 206 in a firmware isolated memory region. The pre-boot firmware environment 208 may be further configured to lock the firmware isolated memory region after copying. The pre-boot firmware environment 208 may be further configured to store the address of the firmware sleep mapper 206 in the sleep mapper model-specific register 124 of the processor 120.

The power manager 126 is configured to detect a wake event after the processor 120 has entered the idle standby power state and then enter, by the processor 120, an active power state in response to detecting the wake event. The power manager 126 is further configured to resume, by the processor 120, the firmware sleep mapper 206 in response to entering the active power state.

Figure 3A:
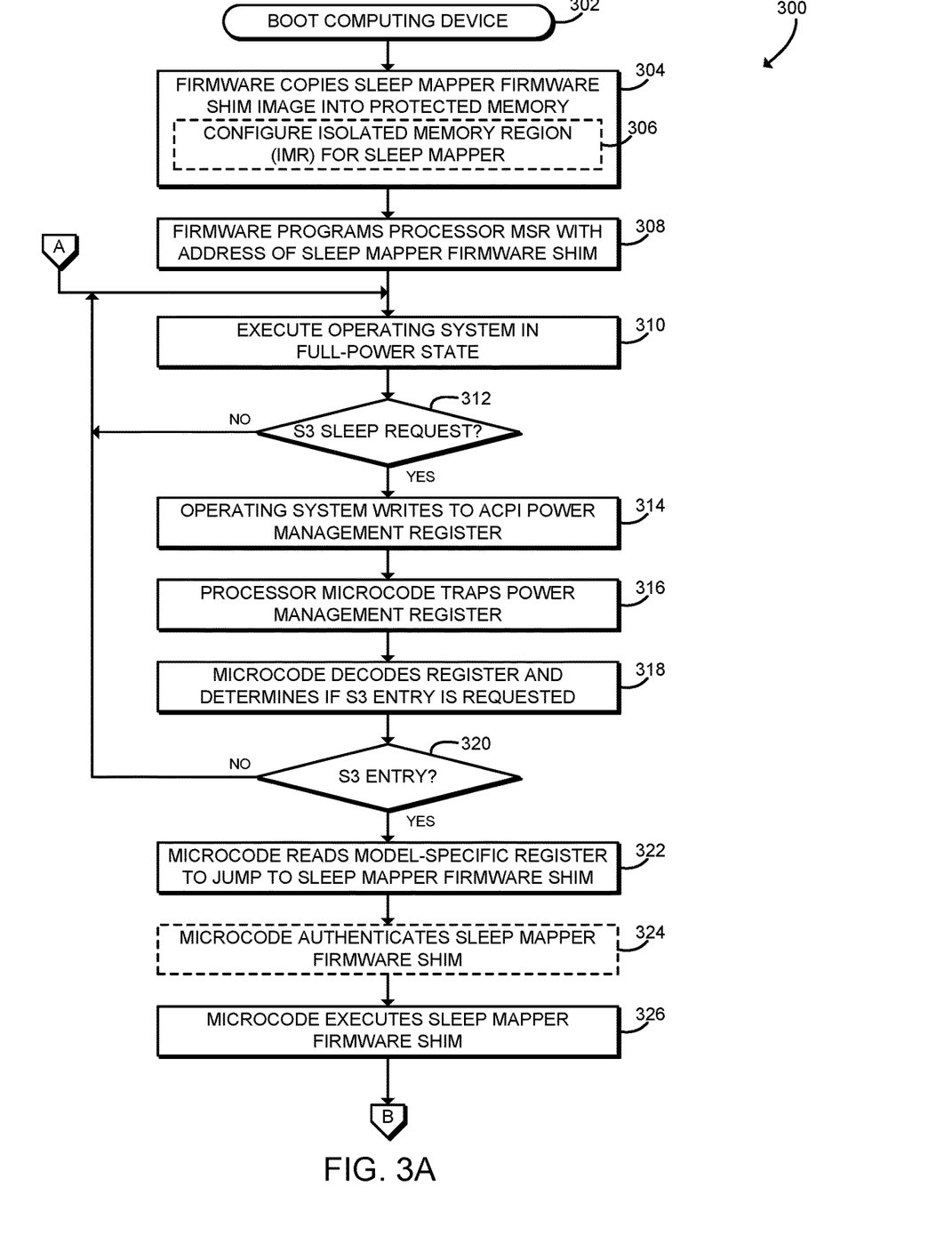
FIGS. 3A and 3B are a simplified flow diagram of at least one embodiment of a method for secure hybrid standby power management that may be executed by the computing device of FIGS. 1 and 2.
Figure 3B:
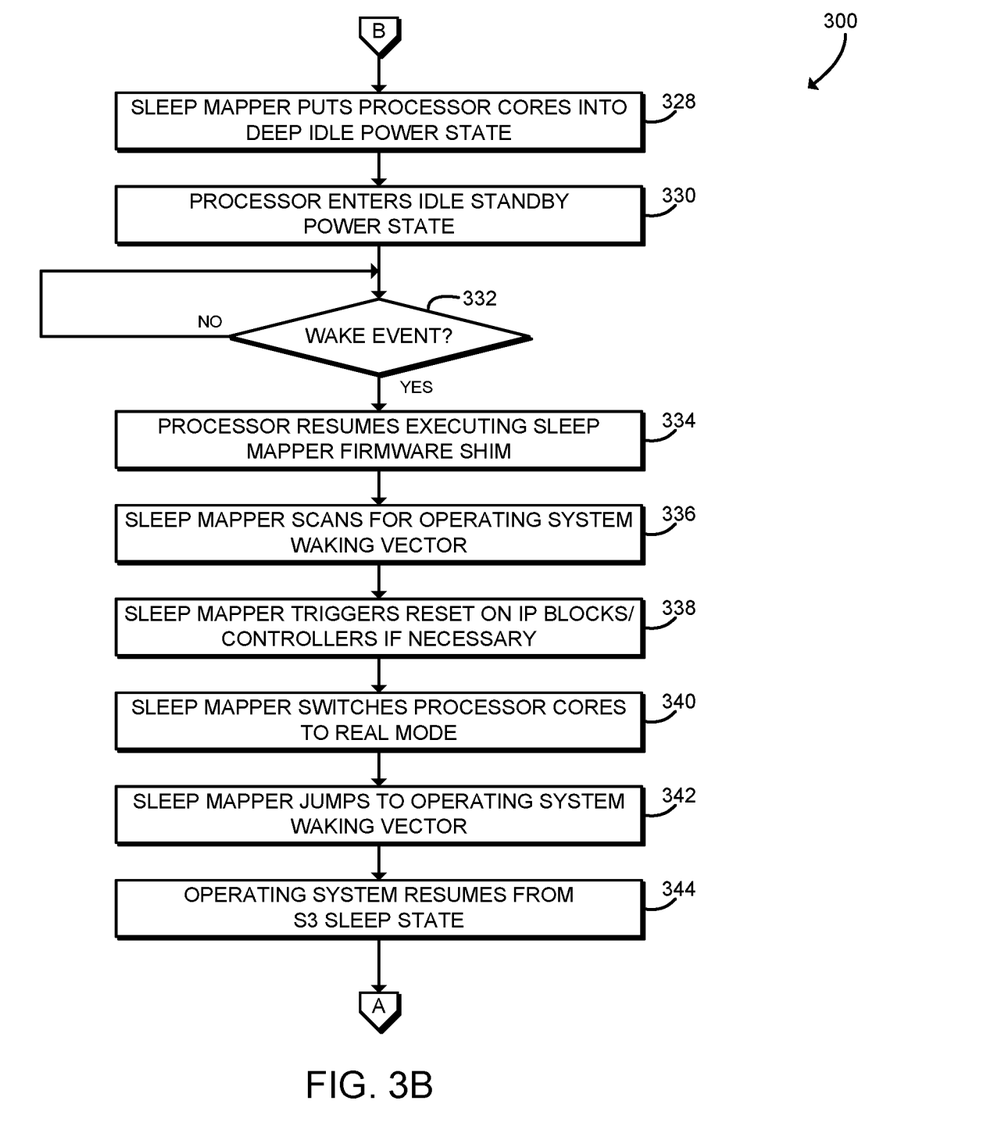

Referring now to FIGS. 3A and 3B, in use, the computing device 100 may execute a method 300 for secure hybrid standby power management. It should be appreciated that, in some embodiments, the operations of the method 300 may be performed by one or more components of the environment 200 of the computing device 100 as shown in FIG. 2. The method 300 begins in block 302, in which the computing device 100 starts a boot process. The boot process may start in response to a power cycle event, for example in response to powering on the computing device 100 or resetting the computing device 100. As part of the boot process, the computing device 100 may initialize hardware components such as the processor 120 and the memory 130 and load the pre-boot firmware environment 208.

In block 304, the pre-boot firmware environment 208 copies a firmware image of the firmware sleep mapper 206 shim function into a protected memory region of the computing device 100. The firmware image may be copied from a non-volatile flash memory of the computing device 100, from the data storage device 132, or from any other appropriate firmware volume. The firmware image may be signed or otherwise be associated with a digital signature that may be used to verify the firmware sleep mapper 206. The protected memory region may be embodied as any region of the memory 130 that may be protected from unauthorized access by the operating system 202 or other processes of the computing device 100. For example, the protected memory region may be designated as read-only and executable, and the permissions of the protected memory region may be locked to prevent modification by the operating system 202 and/or malicious software. In some embodiments, in block 306, the pre-boot firmware environment 208 may configure an isolated memory region (IMR) for the firmware sleep mapper 206 shim. The pre-boot firmware environment 208 may, for example, configure one or more IMR registers to protect the region of the memory 130 that includes the firmware sleep mapper 206. The pre-boot firmware environment 208 may lock the IMR registers to prevent the operating system 202 or other processes of the computing device 100 from modifying the IMR.

In block 308, the pre-boot firmware environment 208 programs the sleep mapper MSR 124 of the processor 120 with the address of the firmware sleep mapper 206. For example, the pre-boot firmware environment 208 may store the base address of the firmware sleep mapper 206 (within the protected memory region) into the sleep mapper MSR 124. In some embodiments, the sleep mapper MSR 124 may also store additional information, such as the length of the firmware sleep mapper 206.

In block 310, the computing device 100 executes the operating system 202 in a full-power state. In the full-power state, the computing device 100 may provide full interactive functionality to a user of the computing device 100. Of course, even when executing in the full-power state, the computing device 100 may continue to manage power consumption, for example by performing processor frequency or voltage scaling. In some embodiments, the computing device 100 may execute in the ACPI S0 power state.

In block 312, the computing device 100 determines whether an S3 sleep request has been received. S3 sleep requests may be generated in response to user actions or by software, for example in response to timer events. For example, the computing device 100 may monitor for ACPI hardware events such as the user pressing a power button or closing the lid of a laptop. As another example, the computing device 100 may monitor for user interface commands to enter the S3 sleep state. As yet another example, the computing device 100 may monitor whether a predetermined period of inactivity has elapsed. If the computing device 100 determines that an S3 sleep request has not been received, the method 300 loops back to block 310 to continue executing the operating system 202 in the full-power state. If the computing device 100 determines that an S3 sleep request has been received, the method 300 advances to block 314.

In block 314, the operating system 202 writes a sleep command to an ACPI power management register. The sleep command is compatible with a command used to enter the ACPI S3 sleep state. For example, the operating system 202 may write to the PM1_CNT ACPI register with the SLP TYPE as S3 and with the SLP_EN set. Of course, the operating system 202 may also perform other operations typically performed when entering the S3 sleep state, such as powering off embedded controllers and/or peripheral devices 136 of the computing device 100 (e.g., by placing those devices in a device power state such as D7).

In block 316, the sleep handler 122 microcode of the processor 120 traps the write to the ACPI power management register. In block 318, the sleep handler 122 decodes the ACPI power management register and determines whether S3 entry was requested. For example, the sleep handler 122 microcode may examine the PM1_CNT ACPI register and determine whether the SLP TYPE is set to S3 and if the SLP_EN bit is set. In block 320, the sleep handler 122 microcode checks whether S3 entry was requested. If not, the method 300 loops back to block 310 to continue executing in the full-power state. Additionally or alternatively, in some embodiments the computing device 100 may perform one or more other power management operations typically performed based on the contents of the power management register. If the sleep handler 122 microcode determines that S3 entry was requested, the method 300 advances to block 322.

In block 322, the sleep handler 122 microcode reads the sleep mapper MSR 124 for the address used to jump to the firmware sleep mapper 206. In some embodiments, in block 324, the sleep handler 122 microcode may authenticate the firmware sleep mapper 206. For example, the sleep handler 122 microcode may verify that the firmware sleep mapper 206 stored in the memory 130 matches a digital signature of the firmware sleep mapper 206. Verifying the firmware sleep mapper 206 may ensure that the firmware sleep mapper 206 was provided by a trusted entity and/or that the firmware sleep mapper 206 has not been modified since being loaded in memory. If the firmware sleep mapper 206 is not verified, the sleep handler 122 microcode may generate an exception or otherwise prevent the firmware sleep mapper 206 from being executed. In block 326, after reading the sleep mapper MSR 124 and optionally verifying the firmware sleep mapper 206, the sleep handler 122 microcode executes the firmware sleep mapper 206 shim. For example, the sleep handler 122 microcode may cause the processor 120 to jump to the base address of the firmware sleep mapper 206 stored in the sleep mapper MSR 124.

In block 328, shown in FIG. 3B, the firmware sleep mapper 206 puts all cores of the processor 120 into a deep idle power state. The deep idle power state may be a low-power state in which the processor 120 is considered to be idle (e.g., halted, clock-reduced, voltage-reduced, power-gated, etc.) but not completely powered off. For example, the deep idle power state may be embodied as a low-power ACPI C-state, such as C7. The firmware sleep mapper 206 may also power down other system controllers, peripherals, and other devices that are not managed by the operating system 202.

In block 330, in response to the firmware putting the processor cores into the deep idle state, the processor 120 enters an idle standby power state. In the idle standby power state, also known as a modern standby state or a connected standby state, the processor 120 has extremely low power consumption but is also capable of entering a full power state in a relatively short amount of time. For example, the processor 120 may exit the idle standby power state and enter a full power state in about 1-2 microseconds. While in the idle standby power state, the processor 120 is halted and does not execute instructions. In some embodiments, the idle standby power state may be an S0ix power state such as S0i3. While the processor 120 is in the idle standby power state, the contents of the memory 130 are preserved, for example by putting the memory 130 into a self-refresh mode.

In block 332, the processor 120 monitors for a wake event. The wake event may be embodied as a user input event, network event, power management event (e.g., power button press, lid opening, etc.), timer, or other event that causes the processor 120 to exit the idle standby power state. If a wake event does not occur, the method 300 loops back to block 332 to continue monitoring for wake events with the processor 120 in the idle standby state. If a wake event occurs, the method 300 advances to block 334.

In block 334, the processor 120 resumes executing the firmware sleep mapper 206. As described above, during the idle standby power state, the processor 120 halts execution. Thus, the processor 120 may cause the firmware sleep mapper 206 to resume execution at the instruction immediately following the instruction(s) that put the processor cores into the deep idle power state as described above in connection with block 328. The processor 120 is not reset after exiting the idle standby power state. The memory 130 is taken out of self-refresh and the contents of the memory 130 are unchanged from before the idle standby power state was entered.

In block 336, the firmware sleep mapper 206 scans for an operating system 202 waking vector. The waking vector may be stored in the memory 130 by the processor 120 and/or platform firmware prior to requesting entry to S3 sleep mode and indicates where execution should resume after exiting the S3 sleep mode. The firmware sleep mapper 206 may use any appropriate technique to locate the waking vector. For example, the firmware sleep mapper 206 may search and/or index one or more firmware configuration tables of the computing device 100 to read the waking vector.

In block 338, the firmware sleep mapper 206 may trigger a reset if required for functional blocks, embedded controllers, or other sub-components of the computing device 100 (e.g., sub-blocks of an SoC including the processor 120, the I/O subsystem 128, and other components). In block 340, the firmware sleep mapper 206 switches the cores of the processor 120 to real mode (i.e., 16-bit physical memory addressing). The firmware sleep mapper 206 switches the processor cores to real mode to match their expected state when exiting S3 sleep. In block 342, the firmware sleep mapper 206 jumps to the operating system 202 waking vector.

In block 344, the operating system 202 resumes from the S3 sleep state. To resume, the operating system 202 executes the code located at the waking vector. The operating system 202 may perform all operations typically performed when resuming from the S3 sleep state, such as switching the processor cores of the processor 120 into protected mode, powering on embedded controllers and/or peripheral devices 136 of the computing device 100 (e.g., by placing those devices in a full-power device state such as D0), and other operations. After resuming, the method 300 loops back to block 310, shown in FIG. 3A, to continue executing the operating system 202 in a full-power state.

It should be appreciated that, in some embodiments, the method 300 may be embodied as various instructions stored on a computer-readable media, which may be executed by the processor 120 and/or other components of the computing device 100 to cause the computing device 100 to perform the method 300. The computer-readable media may be embodied as any type of media capable of being read by the computing device 100 including, but not limited to, the memory 130, the data storage device 132, firmware devices, other memory or data storage devices of the computing device 100, portable media readable by a peripheral device 136 of the computing device 100, and/or other media.

EXAMPLES

Illustrative examples of the technologies disclosed herein are provided below. An embodiment of the technologies may include any one or more, and any combination of, the examples described below.

Example 1 includes a computing device for low-power standby, the computing device comprising: an operating system power manager to generate a write to a power management control register of the computing device, wherein the write comprises a power management sleep request; and a processor that includes a sleep handler to (i) trap the write to the power management control register, and (ii) execute a firmware sleep mapper in response to a trap of the write to the power management control register, wherein an address of the firmware sleep mapper is included in a model-specific register of the processor; wherein the firmware sleep mapper is to cause the processor of the computing device to enter an idle standby power state in response to execution of the firmware sleep mapper.

Example 2 includes the subject matter of Example 1, and wherein: the sleep handler is further to verify the firmware sleep mapper in response to the trap of the write to the power management control register; and to execute the firmware sleep mapper comprises to execute the firmware sleep mapper in response to verification of the firmware sleep mapper.

Example 3 includes the subject matter of any of Examples 1 and 2, and wherein to verify the firmware sleep mapper comprises to verify a digital signature of the firmware sleep mapper.

Example 4 includes the subject matter of any of Examples 1-3, and wherein the firmware sleep mapper is located in a firmware isolated memory region.

Example 5 includes the subject matter of any of Examples 1-4, and further comprising a pre-boot firmware environment to copy a binary image of the firmware sleep mapper to the address of the firmware sleep mapper in the firmware isolated memory region.

Example 6 includes the subject matter of any of Examples 1-5, and wherein the pre-boot firmware environment is further to store the address of the firmware sleep mapper in the model-specific register of the processor.

Example 7 includes the subject matter of any of Examples 1-6, and wherein the pre-boot firmware environment is further to lock the firmware isolated memory region in response to copying of the binary image of the firmware sleep mapper to the address of the firmware sleep mapper in the firmware isolated memory region.

Example 8 includes the subject matter of any of Examples 1-7, and wherein the power management sleep request comprises an ACPI S3 sleep request.

Example 9 includes the subject matter of any of Examples 1-8, and wherein the power management control register comprises a PM1_CNT register.

Example 10 includes the subject matter of any of Examples 1-9, and wherein the sleep handler comprises microcode of the processor.

Example 11 includes the subject matter of any of Examples 1-10, and wherein: the sleep handler is further to determine whether the write is indicative of a power management sleep request in response to the trap of the write to the power management control register; and to execute the firmware sleep mapper comprises to execute the firmware sleep mapper in response to a determination that the write is indicative of a power management sleep request.

Example 12 includes the subject matter of any of Examples 1-11, and wherein to cause the processor of the computing device to enter the idle standby power state comprises to set each core of the processor to a deep idle power state.

Example 13 includes the subject matter of any of Examples 1-12, and wherein the deep idle power state comprises a C7 power state.

Example 14 includes the subject matter of any of Examples 1-13, and wherein the idle standby power state comprises an S0ix idle standby state.

Example 15 includes the subject matter of any of Examples 1-14, and wherein: the processor comprises a power manager to (i) detect a wake event in response to causing the processor to enter the idle standby power state, (ii) enter, by the processor, an active power state in response to detection of the wake event, and (iii) resume, by the processor, the firmware sleep mapper in response to entrance to the active power state; and the firmware sleep mapper is to (i) switch the processor to real mode in response to resumption of the firmware sleep mapper and (ii) jump to a waking vector of the operating system in response to a switch to the real mode.

Example 16 includes the subject matter of any of Examples 1-15, and wherein: the firmware sleep mapper is further to load the waking vector from a firmware configuration table of the computing device; and to jump to the waking vector comprises to jump to the waking vector in response to a load of the waking vector.

Example 17 includes the subject matter of any of Examples 1-16, and wherein the firmware sleep mapper is further to reset an embedded controller of the computing device in response to the resumption of the firmware sleep mapper.

Example 18 includes a method for low-power standby, the method comprising: generating, by an operating system of a computing device, a write to a power management control register of the computing device, wherein the write comprises a power management sleep request; trapping, by a processor of the computing device, the write to the power management control register; executing, by the processor, a firmware sleep mapper in response to trapping the write to the power management control register, wherein an address of the firmware sleep mapper is included in a model-specific register of the processor; and causing, by the firmware sleep mapper, the processor of the computing device to enter an idle standby power state in response to executing the firmware sleep mapper.

Example 19 includes the subject matter of Example 18, and further comprising: verifying, by the processor, the firmware sleep mapper in response to trapping the write to the power management control register; wherein executing the firmware sleep mapper comprises executing the firmware sleep mapper in response to verifying the firmware sleep mapper.

Example 20 includes the subject matter of any of Examples 18 and 19, and wherein verifying the firmware sleep mapper comprises verifying a digital signature of the firmware sleep mapper.

Example 21 includes the subject matter of any of Examples 18-20, and wherein the firmware sleep mapper is located in a firmware isolated memory region.

Example 22 includes the subject matter of any of Examples 18-21, and further comprising copying, by a pre-boot firmware environment of the computing device, a binary image of the firmware sleep mapper to the address of the firmware sleep mapper in the firmware isolated memory region.

Example 23 includes the subject matter of any of Examples 18-22, and further comprising storing, by the pre-boot firmware environment of the computing device, the address of the firmware sleep mapper in the model-specific register of the processor.

Example 24 includes the subject matter of any of Examples 18-23, and further comprising locking, by the pre-boot firmware environment of the computing device, the firmware isolated memory region in response to copying the binary image of the firmware sleep mapper to the address of the firmware sleep mapper in the firmware isolated memory region.

Example 25 includes the subject matter of any of Examples 18-24, and wherein the power management sleep request comprises an ACPI S3 sleep request.

Example 26 includes the subject matter of any of Examples 18-25, and wherein the power management control register comprises a PM1_CNT register.

Example 27 includes the subject matter of any of Examples 18-26, and wherein trapping the write to the power management control register comprises trapping, by microcode of the processor, the write to the power management control register.

Example 28 includes the subject matter of any of Examples 18-27, and further comprising: determining, by the processor, whether the write is indicative of a power management sleep request in response to trapping the write to the power management control register; wherein executing the firmware sleep mapper comprises executing the firmware sleep mapper in response to determining that the write is indicative of a power management sleep request.

Example 29 includes the subject matter of any of Examples 18-28, and wherein causing the processor of the computing device to enter the idle standby power state comprises setting each core of the processor to a deep idle power state.

Example 30 includes the subject matter of any of Examples 18-29, and wherein setting each core of the processor to the deep idle power state comprises setting each core to a C7 power state.

Example 31 includes the subject matter of any of Examples 18-30, and wherein causing the processor to enter the idle standby power state comprises causing the processor to enter an S0ix idle standby state.

Example 32 includes the subject matter of any of Examples 18-31, and further comprising: detecting, by the processor, a wake event in response to causing the processor to enter the idle standby power state; entering, by the processor, an active power state in response to detecting the wake event; resuming, by the processor, the firmware sleep mapper in response to entering the active power state; switching, by the firmware sleep mapper, the processor to real mode in response to resuming the firmware sleep mapper; and jumping, by the firmware sleep mapper, to a waking vector of the operating system in response to switching to the real mode.

Example 33 includes the subject matter of any of Examples 18-32, and further comprising: loading, by the firmware sleep mapper, the waking vector from a firmware configuration table of the computing device; wherein jumping to the waking vector comprises jumping to the waking vector in response to loading the waking vector.

Example 34 includes the subject matter of any of Examples 18-33, and further comprising resetting, by the firmware sleep mapper, an embedded controller of the computing device in response to resuming the firmware sleep mapper.

Example 35 includes a computing device comprising: a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for low-power standby, the computing device comprising: means for generating, by an operating system of the computing device, a write to a power management control register of the computing device, wherein the write comprises a power management sleep request; means for trapping, by a processor of the computing device, the write to the power management control register; means for executing, by the processor, a firmware sleep mapper in response to trapping the write to the power management control register, wherein an address of the firmware sleep mapper is included in a model-specific register of the processor; and means for causing, by the firmware sleep mapper, the processor of the computing device to enter an idle standby power state in response to executing the firmware sleep mapper.

Example 39 includes the subject matter of Example 38, and further comprising: means for verifying, by the processor, the firmware sleep mapper in response to trapping the write to the power management control register; wherein the means for executing the firmware sleep mapper comprises means for executing the firmware sleep mapper in response to verifying the firmware sleep mapper.

Example 40 includes the subject matter of any of Examples 38 and 39, and wherein the means for verifying the firmware sleep mapper comprises means for verifying a digital signature of the firmware sleep mapper.

Example 41 includes the subject matter of any of Examples 38-40, and wherein the firmware sleep mapper is located in a firmware isolated memory region.

Example 42 includes the subject matter of any of Examples 38-41, and further comprising means for copying, by a pre-boot firmware environment of the computing device, a binary image of the firmware sleep mapper to the address of the firmware sleep mapper in the firmware isolated memory region.

Example 43 includes the subject matter of any of Examples 38-42, and further comprising means for storing, by the pre-boot firmware environment of the computing device, the address of the firmware sleep mapper in the model-specific register of the processor.

Example 44 includes the subject matter of any of Examples 38-43, and further comprising means for locking, by the pre-boot firmware environment of the computing device, the firmware isolated memory region in response to copying the binary image of the firmware sleep mapper to the address of the firmware sleep mapper in the firmware isolated memory region.

Example 45 includes the subject matter of any of Examples 38-44, and wherein the power management sleep request comprises an ACPI S3 sleep request.

Example 46 includes the subject matter of any of Examples 38-45, and wherein the power management control register comprises a PM1_CNT register.

Example 47 includes the subject matter of any of Examples 38-46, and wherein the means for trapping the write to the power management control register comprises means for trapping, by microcode of the processor, the write to the power management control register.

Example 48 includes the subject matter of any of Examples 38-47, and further comprising: means for determining, by the processor, whether the write is indicative of a power management sleep request in response to trapping the write to the power management control register; wherein the means for executing the firmware sleep mapper comprises means for executing the firmware sleep mapper in response to determining that the write is indicative of a power management sleep request.

Example 49 includes the subject matter of any of Examples 38-48, and wherein the means for causing the processor of the computing device to enter the idle standby power state comprises means for setting each core of the processor to a deep idle power state.

Example 50 includes the subject matter of any of Examples 38-49, and wherein the means for setting each core of the processor to the deep idle power state comprises means for setting each core to a C7 power state.

Example 51 includes the subject matter of any of Examples 38-50, and wherein the means for causing the processor to enter the idle standby power state comprises means for causing the processor to enter an S0ix idle standby state.

Example 52 includes the subject matter of any of Examples 38-51, and further comprising: means for detecting, by the processor, a wake event in response to causing the processor to enter the idle standby power state; means for entering, by the processor, an active power state in response to detecting the wake event; means for resuming, by the processor, the firmware sleep mapper in response to entering the active power state; means for switching, by the firmware sleep mapper, the processor to real mode in response to resuming the firmware sleep mapper; and means for jumping, by the firmware sleep mapper, to a waking vector of the operating system in response to switching to the real mode.

Example 53 includes the subject matter of any of Examples 38-52, and further comprising: means for loading, by the firmware sleep mapper, the waking vector from a firmware configuration table of the computing device; wherein the means for jumping to the waking vector comprises means for jumping to the waking vector in response to loading the waking vector.

Example 54 includes the subject matter of any of Examples 38-53, and further comprising means for resetting, by the firmware sleep mapper, an embedded controller of the computing device in response to resuming the firmware sleep mapper.

The invention claimed is:

1. A computing device for low-power standby, the computing device comprising:
   an operating system power manager to generate a write in a first processor operating mode to a power management control register of the computing device, wherein the write comprises a power management sleep request; and
   a processor that includes a sleep handler to (i) trap the write to the power management control register, and (ii) execute a firmware sleep mapper in the first processor operating mode in response to a trap of the write to the power management control register, wherein an address of the firmware sleep mapper is included in a model-specific register of the processor;
   wherein the firmware sleep mapper is to cause the processor of the computing device to enter an idle standby power state in response to execution of the firmware sleep mapper.

2. The computing device of claim 1, wherein:
   the sleep handler is further to verify the firmware sleep mapper in response to the trap of the write to the power management control register; and
   to execute the firmware sleep mapper comprises to execute the firmware sleep mapper in response to verification of the firmware sleep mapper.

3. The computing device of claim 1, wherein the firmware sleep mapper is located in a firmware isolated memory region.

4. The computing device of claim 3, further comprising a pre-boot firmware environment to copy a binary image of the firmware sleep mapper to the address of the firmware sleep mapper in the firmware isolated memory region.

5. The computing device of claim 4, wherein the pre-boot firmware environment is further to lock the firmware isolated memory region in response to copying of the binary image of the firmware sleep mapper to the address of the firmware sleep mapper in the firmware isolated memory region.

6. The computing device of claim 1, wherein the power management sleep request comprises an ACPI S3 sleep request.

7. The computing device of claim 1, wherein the power management control register comprises a PM1_CNT register.

8. The computing device of claim 1, wherein the sleep handler comprises microcode of the processor.

9. The computing device of claim 1, wherein:
   the sleep handler is further to determine whether the write is indicative of a power management sleep request in response to the trap of the write to the power management control register; and to execute the firmware sleep mapper comprises to execute the firmware sleep mapper in response to a determination that the write is indicative of a power management sleep request.

10. The computing device of claim 1, wherein to cause the processor of the computing device to enter the idle standby power state comprises to set each core of the processor to a deep idle power state.

11. The computing device of claim 10, wherein the deep idle power state comprises a C7 power state.

12. The computing device of claim 1, wherein the idle standby power state comprises an S0ix idle standby state.

13. The computing device of claim 1, wherein:
the processor comprises a power manager to (i) detect a wake event in response to causing the processor to enter the idle standby power state, (ii) enter, by the processor, an active power state in response to detection of the wake event, and (iii) resume, by the processor, the firmware sleep mapper in response to entrance to the active power state; and
the firmware sleep mapper is to (i) switch the processor to real mode in response to resumption of the firmware sleep mapper and (ii) jump to a waking vector of the operating system in response to a switch to the real mode.

14. A method for low-power standby, the method comprising:
generating, by an operating system of a computing device, a write in a first processor operating mode to a power management control register of the computing device, wherein the write comprises a power management sleep request;
trapping, by a processor of the computing device, the write to the power management control register;
executing, by the processor, a firmware sleep mapper in the first processor operating mode in response to trapping the write to the power management control register, wherein an address of the firmware sleep mapper is included in a model-specific register of the processor; and
causing, by the firmware sleep mapper, the processor of the computing device to enter an idle standby power state in response to executing the firmware sleep mapper.

15. The method of claim 14, further comprising:
verifying, by the processor, the firmware sleep mapper in response to trapping the write to the power management control register;
wherein executing the firmware sleep mapper comprises executing the firmware sleep mapper in response to verifying the firmware sleep mapper.

16. The method of claim 14, wherein the firmware sleep mapper is located in a firmware isolated memory region.

17. The method of claim 14, wherein causing the processor of the computing device to enter the idle standby power state comprises setting each core of the processor to a deep idle power state.

18. The method of claim 14, wherein causing the processor to enter the idle standby power state comprises causing the processor to enter an S0ix idle standby state.

19. The method of claim 14, further comprising:
detecting, by the processor, a wake event in response to causing the processor to enter the idle standby power state;
entering, by the processor, an active power state in response to detecting the wake event;
resuming, by the processor, the firmware sleep mapper in response to entering the active power state;
switching, by the firmware sleep mapper, the processor to real mode in response to resuming the firmware sleep mapper; and
jumping, by the firmware sleep mapper, to a waking vector of the operating system in response to switching to the real mode.

20. One or more non-transitory, computer-readable storage media comprising a plurality of instructions that in response to being executed cause a computing device to:
generate, by an operating system of the computing device, a write in a first processor operating mode to a power management control register of the computing device, wherein the write comprises a power management sleep request;
trap, by a processor of the computing device, the write to the power management control register;
execute, by the processor, a firmware sleep mapper in the first processor operating mode in response to trapping the write to the power management control register, wherein an address of the firmware sleep mapper is included in a model-specific register of the processor; and
cause, by the firmware sleep mapper, the processor of the computing device to enter an idle standby power state in response to executing the firmware sleep mapper.

21. The one or more non-transitory, computer-readable storage media of claim 20, further comprising a plurality of instructions that in response to being executed cause the computing device to:
verify, by the processor, the firmware sleep mapper in response to trapping the write to the power management control register;
wherein to execute the firmware sleep mapper comprises to execute the firmware sleep mapper in response to verifying the firmware sleep mapper.

22. The one or more non-transitory, computer-readable storage media of claim 20, wherein the firmware sleep mapper is located in a firmware isolated memory region.

23. The one or more non-transitory, computer-readable storage media of claim 20, wherein to cause the processor of the computing device to enter the idle standby power state comprises to set each core of the processor to a deep idle power state.

24. The one or more non-transitory, computer-readable storage media of claim 20, wherein to cause the processor to enter the idle standby power state comprises to cause the processor to enter an S0ix idle standby state.

25. The one or more non-transitory, computer-readable storage media of claim 20, further comprising a plurality of instructions that in response to being executed cause the computing device to:
detect, by the processor, a wake event in response to causing the processor to enter the idle standby power state;
enter, by the processor, an active power state in response to detecting the wake event;
resume, by the processor, the firmware sleep mapper in response to entering the active power state;
switch, by the firmware sleep mapper, the processor to real mode in response to resuming the firmware sleep mapper; and
jump, by the firmware sleep mapper, to a waking vector of the operating system in response to switching to the real mode.

* * * * *